2,696,492
MERCAPTIDE-DITHIOCARBAMATE METALLIC SALTS AND THE PROCESS OF PRODUCING THEM

John Mann Butler, Centerville, Ohio, assignor to Monsanto Chemical Company, St. Louis, Mo., a corporation of Delaware No Drawing. Application April 26, 1952,
Serial No. 284,641

15 Claims. (Cl. 260—429)

The present invention broadly relates to the manufacture of useful new chemical compounds which are mixed mercaptide-dithiocarbamate metallic salts and to the method of producing same. A more limited aspect of the present invention relates to the production of (alkylmercapto)-zinc N,N-dialkyl dithiocarbamates, wherein the (tert-alkylmercapto)-derivatives thereof are preferred embodiments, and to the process of producing same.

The divalent heavy metal N,N-disubstituted dithiocarbamates are well known articles of commerce, members of which are important accelerators for the vulcanization of rubber. Thus, for example, zinc N,N-dimethyl dithiocarbamate is reported to be one of the most powerful accelerators known (ACS Monograph No. 74, p. 296) and is widely used in the rubber industry.

The novel mercaptide-dithiocarbamate metallic salts of this invention have been found to produce superior rubber compositions to those manufactured with the prior art accelerators and in addition have chemical and physical properties which enables their use in other fields, as for example, as antioxidants in the formulation of lubricating oils. This invention thus provides a new class of compounds for further industrial development.

The alkali dithiocarbamates can be prepared from secondary and primary amines, carbon disulfide and an alkali metal hydroxide, each reactant preferably being employed in substantially equimolecular amounts. The preparation of the alkali dithiocarbamates can be illustrated by the following equation:

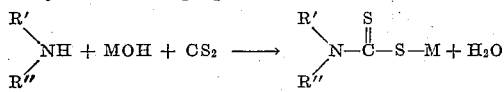

wherein R' is an organic radical, R" is selected from the group consisting of hydrogen and an organic radical, or R' and R" together can represent a divalent organic radical and M is an alkali metal. Preferably the carbon atom-containing portion of the primary and secondary amine is a saturated hydrocarbon radical free from non-benzenoid unsaturation. Accordingly the monovalent hydrocarbon radicals are selected from the group consisting of alkyl, cycloalkyl, aryl, alkaryl and aralkyl radicals which preferably contain up to about 18 carbon atoms and more preferably still do not exceed about 8 carbon atoms. The alkyl radicals are specifically preferred in the instant invention. Where R' and R" are taken together to represent a divalent hydrocarbon radical the polymethylene radicals, for example, pentamethylene, etc. can be cited as illustrative.

Various hydrocarbon mercaptans can be employed to form the half-salt with the water-soluble divalent heavy metal salt. Thus R, in the mercaptan RSH, can be a monovalent saturated hydrocarbon radical free from non-benzenoid unsaturation, that is an alkyl, cycloalkyl, aryl, aralkyl or alkaryl radical. The alkyl radicals containing up to 16 carbon atoms are preferred and the tert-alkyl radicals are specifically preferred.

The preparation of the mercaptide-dithiocarbamate metallic salts can be illustrated by the following equation:

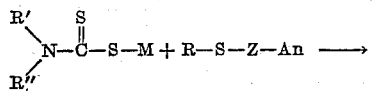

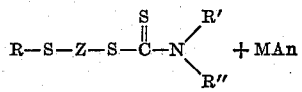

wherein An is a water-solubilizing anion of a weak acid. Thus the novel compounds of this invention are shown by the illustrative formula:

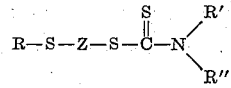

wherein R, R' and R" are as previously indicated and Z is a polyvalent heavy metal.

The following examples are illustrative of the invention:

Example 1

A 5-liter three-necked flask equipped with an agitator and a reflux condenser was charged with 1500 Ml. of methanol and 220 g. (1 mole) of zinc acetate dihydrate, after which the mixture was heated with agitation until a clear solution was obtained. Then 210 g. (1 mole) of tert-dodecyl mercaptan was added and a precipitate formed immediately. Refluxing and agitation were continued for about 15 minutes, after which time heating was discontinued and the flask and contents were allowed to air cool. The liquid was decanted from the flask and the precipitate washed with methanol, first by agitating same with the precipitate in the flask and then washing six times with methanol in a Waring Blender. The white precipitate was filtered and air dried. The white powder was identified as the mixed salt zinc tert-dodecylmercaptide-acetate or (tert-dodecylmercapto)-zinc acetate.

Example 2

A 2-liter separatory funnel was charged with 330 ml. of water and 42 g. (0.637 mole) of 85 per cent potassium hydroxide and 82.3 g. (0.637 mole) of di-n-butylamide were added thereto. Then 38.3 ml. (0.637 mole) of carbon disulfide was slowly added with shaking and intermittent cooling.

Then 202 g. (0.637 mole) of (tert-dodecylmercapto)-zinc acetate was dissolved in 1000 ml. of hexane in a 3-liter three-necked flask equipped with a stirrer. The aqueous potassium N,N-di-n-butyl dithiocarbamate solution was then added with agitation and agitation continued for about 45 mintes. The mixture was allowed to separate and the aqueous potassium acetate solution was discarded. The hexane solution was washed with water until neutral and then dried over anhydrous sodium sulfate. The solution was filtered into an evaporating dish, which was placed in the hood, and the solvent allowed to evaporate at ambient temperature. Then the substantially solvent-free reaction product was transferred to a vacuum oven at about 25 mm. of mercury and 50° C. and allowed to stand overnight. The viscous, oily, clear, light straw colored reaction product was obtained in a substantially quantitative yield (290 g. equivalent to a 97% yield) and identified as (tert-dodecylmercapto)-zinc N,N-di-n-butyl dithiocarbamate. Calculated for $C_{21}S_{43}S_3NZn$: S, 20.4; N, 3.0. Found: S, 20.3; N, 3.1.

Example 3

In a similar manner to example two 6.6 g. (0.1 mole) of 85 per cent potassium hydroxide was dissolved in 50 ml. of water. Then 12.9 g. (0.1 mole) of di-n-butylamine was dissolved therein and 6.6 ml. (0.11 mole) of carbon disulfide added thereto with cooling.

A solution containing 27 g. (0.1 mole) of (tert-octylmercapto)-zinc acetate in a mixture of 65 ml. of water and 31 g. of hexane was prepared and the above aqueous potassium N,N-di-n-butyl dithiocarbamate solution was added thereto with agitation. Then the two phases were allowed to separate, the aqueous potassium acetate solution removed and discarded, and the hexane solution was washed with water until neutral. Then the solvent and any remaining water were removed by distillation. The product was identified as (tert-octylmercapto)-zinc N,N-di-n-butyl dithiocarbamate.

Example 4

In a similar manner to example two 26.4 g. (0.4 mole) of 85 per cent potassium hydroxide was dissolved in 200 ml. of water and 16.3 g. (0.2 mole) of dimethylamine hydrochloride was added thereto. Then 12 ml. (0.2 mole) of carbon disulfide was introduced with agitation and cooling.

A solution of 65 g. (0.2 mole) of (tert-dodecylmercapto)-zinc acetate in 250 ml. of hexane was prepared and mixed with agitation with the aqueous potassium N,N-dimethyl dithiocarbamate solution. Thereafter the two phases were allowed to separate, the aqueous solution of potassium acetate and potassium chloride was removed and discarded, and the hexane solution was washed with water until neutral. The solvent and any residual water were then removed by distillation. The slightly yellowish, waxy product was identified as (tert-dodecylmercapto)-zinc N,N-dimethyl dithiocarbamate.

Other illustrative zinc salts which can be prepared in a similar manner are for example:

(Tert-octylmercapto)-zinc N,N-dimethyl dithiocarbamate,
(Tert-tetradecylmercapto)-zinc N,N-dimethyl dithiocarbamate,
(Tert-butylmercapto)-zinc N,N-dipropyl dithiocarbamate,
(Tert-pentylmercapto)-zinc N,N-dioctyl dithiocarbamate,
(Tert-heptylmercapto)-zinc N-ethyl-N-methyl dithiocarbamate,
(Tert-octylmercapto)-zinc N,N-diethyl dithiocarbamate,
(Tert-dodecylmercapto)-zinc N,N-dibutyl dithiocarbamate,
(Tert-hexadecylmercapto)-zinc N,N-dimethyl dithiocarbamate,
(2-ethylhexylmercapto)-zinc N,N-dioctyl dithiocarbamate,
(Decylmercapto)-zinc N-phenyl dithiocarbamate,
(Cyclohexylmercapto)-zinc N-tolyl dithiocarbamate,
(Isopropylmercapto)-zinc N-benzyl dithiocarbamate,
(Hexadecylmercapto)-zinc N-cyclopentyl-N-ethyl dithiocarbamate,
(Phenethylmercapto)zinc N,N-dibutyl dithiocarbamate,
(Xylylmercapto)-zinc N,N-diphenyl dithiocarbamate,
(Phenylmercapto)-zinc N,N-dihexyl dithiocarbamate,
(Cyclobutylmercapto)-zinc hexamethylene dithiocarbamate,
(Tert-octylmercapto)-zinc N-α-naphthyl dithiocarbamate,
(Dodecylmercapto)-zinc N-bicyclohexyl dithiocarbamate,
(Tert-butylmercapto)-zinc N-octadecyl dithiocarbamate,
(Isopropylmercapto)-zinc N-anthryl dithiocarbamate,
(Phenylmercapto)-zinc N-biphenylyl dithiocarbamate,
(Tert-heptylmercapto)-zinc N,N-di-α-naphthyl dithiocarbamate, and the like.

Whereas the above illustrative examples are directed to the production of mixed salts of zinc, other heavy metal salts can be prepared and are within the scope of the present invention. The divalent heavy metals are particularly preferred, but suitable polyvalent heavy metals can be employed. Some illustrative mixed salts are:

(Tert-butylmercapto)-mercuric N,N-dioctyl dithiocarbamate,
(Hexadecylmercapto)-lead N,N-dimethyl dithiocarbamate,
(Tert-dodecylmercapto)-cadmium N-ethyl-N-methyl dithiocarbamate,
(2-ethylhexylmercapto)-cupric N,N-diisopropyl dithiocarbamate,
(Tert-octylmercapto)-ferrous N,N-diethyl dithiocarbamate,
(Tert-pentylmercapto)-stannous N-octadecyl dithiocarbamate,
(Tert-heptylmercapto)-lead N-ethyl-N-phenyl dithiocarbamate, and the like.

Whereas hexane has been employed in the above examples, other suitable inert water-immiscible organic solvents can be employed, as for example, benzene, toluene, carbon tetrachloride, trichloroethane, kerosene, suitable hydrocarbon lubricating oils, and the like. In general the inert hydrocarbon solvents are preferably employed. When it is desirable to isolate the mercaptide-dithiocarbamate metallic salts it is preferred that the solvent selected should have sufficient volatility such that it can be readily removed by evaporation or distillation.

The process of this invention is substantially complete in a very short time and provides essentially stoichiometric amounts of the desired products. To effect phase transfer of the reactants it is preferred that the reaction mixture be agitated thoroughly such that the two phases are well mixed for a period of from about 30 minutes to about 1 hour or more, then agitation is terminated and the two immiscible phases allowed to separate. After removal of the aqueous phase by conventional means, the solvent phase is well washed to a neutral pH and until substantially all water-soluble salts are eliminated therefrom. Then the desired product is recovered by evaporating or distilling off the solvent. The product can be purified or recrystallized from the same solvent or different suitable solvents if desired. For certain applications, for example, wherein the product is employed as a lubricating oil additive or as a general biological toxicant the solvent can be selected such that the mixture can be employed per se without isolation of the mercaptide-dithiocarbamate metallic salts.

Many of the novel compounds of this invention have been found to be very useful as antioxidants in the formulation of improved lubricating oil compositions, as rubber vulcanization accelerators, and as general biological toxicants such as insecticides and fungicides.

The lubricating oil compositions containing the novel compounds of this invention which were found to be particularly useful are disclosed and claimed in my copending application, Serial No. 284,642, filed April 26, 1952. It was found that the novel compounds having the illustrative formula:

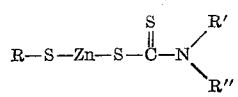

wherein R represents a tert-alkyl radical containing from 8 to 16 carbon atoms and R' and R'' represent alkyl radicals containing up to 8 carbon atoms, have excellent properties as antioxidants in mineral lubricating oil compositions. The branched-chain alkyl radicals are specifically preferred for their oil-solubility characteristics.

I claim:

1. A (tert-alkylmercapto)-zinc N,N-dialkyl dithiocarbamate having the formula:

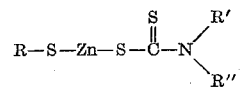

wherein R is a tert-alkyl radical containing from 8 to 16 carbon atoms and R' and R'' are alkyl radicals containing up to 8 carbon atoms.

2. The compound (tert-dodecylmercapto)-zinc N,N-di-n-butyl dithiocarbamate.

3. The compound (tert-octylmercapto)-zinc N,N-di-n-butyl dithiocarbamate.

4. The compound (tert-dodecylmercapto)-zinc N,N-dimethyl dithiocarbamate.

5. The compound (tert-octylmercapto)-zinc N,N-dimethyl dithiocarbamate.

6. The compound (tert-tetradecylmercapto)-zinc N,N-dimethyl dithiocarbamate.

7. The process of preparing mercaptide-dithiocarbamate metallic salts having the formula:

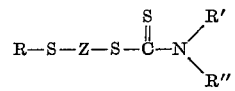

wherein R is a tert-alkyl radical containing 4 to 16 carbon atoms, R' is a saturated hydrocarbon radical free from non-benzenoid unsaturation containing up to 18 carbon atoms, R'' is selected from the group consisting of hydrogen and R', and Z is a divalent heavy metal; comprising the reaction of (A) substantially equimolecular quantities of an amine having the formula:

wherein R' and R'' are as indicated above, (2) carbon disulfide, and (3) an alkali metal hydroxide in an aqueous medium; then adding thereto with agitation (B) a substantially equimolecular quantity of a divalent heavy metal salt, wherein one anion is a water-solubilizing anion derived from a weak acid and the other anion is the mercapto radical RS-, wherein R is as indicated above, dissolved in an inert water-immiscible solvent and continuing agitation for a sufficient time to effect substantial completion of the reaction, separating the solvent phase from the aqueous phase and washing said solvent phase with water until substantially neutral and free from water-soluble salts.

8. The process of preparing (tert-alkylmercapto)-zinc N,N-dialkyl dithiocarbamates having the formula:

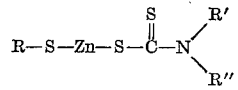

wherein R is a tert-alkyl radical containing 4 to 16 carbon atoms and R' and R" are alkyl radicals containing up to 8 carbon atoms, comprising the reaction of (A) substantially equimolecular quantities of (1) an amine having the formula:

wherein R' and R" are as indicated above, (2) carbon disulfide, and (3) an alkali metal hydroxide in an aqueous medium; then adding thereto with agitation (B) a substantially equimolecular quantity of a zinc salt, wherein one anion is a water-solubilizing anion derived from a weak acid and the other anion is the mercapto radical RS-, wherein R is as indicated above, dissolved in an inert water-immiscible solvent and continuing agitation for a sufficient time to effect substantial completion of the reaction, separating the solvent phase from the aqueous phase and washing said solvent phase with water until substantially neutral and free from water-soluble salts.

9. The process of claim 10 wherein the water-immiscible solvent is hexane.

10. The process of preparing (tert-dodecylmercapto)-zinc N,N-di-n-butyl dithiocarbamate comprising the reaction of (A) substantially equimolecular quantities of (1) di-n-butylamine, (2) carbon disulfide, and (3) potassium hydroxide in an aqueous medium; then adding thereto with agitation (B) a substantially equimolecular quantity of (tert-dodecylmercapto)-zinc acetate dissolved in an inert water-immiscible organic solvent and continuing agitation for from about 30 minutes to about 1 hour to effect substantial completion of the reaction, separating the solvent phase from the aqueous phase and washing said solvent phase with water until substantially neutral and free from water-soluble salts.

11. The process of preparing (tert-octylmercapto)-zinc N,N-di-n-butyl dithiocarbamate comprising the reaction of (A) substantially equimolecular quantities of (1) di-n-butylamine, (2) carbon disulfide, and (3) potassium hydroxide in an aqueous medium; then adding thereto with agitation (B) a substantially equimolecular quantity of (tert-octylmercapto)-zinc acetate dissolved in an inert water-immiscible organic solvent and continuing agitation for from about 30 minutes to about 1 hour to effect substantial completion of the reaction, separating the solvent phase from the aqueous phase and washing said solvent phase with water until substantially neutral and free from water-soluble salts.

12. The process of preparing (tert-dodecylmercapto)-zinc N,N-dimethyl dithiocarbamate comprising the reaction of (A) substantially equimolecular quantities of (1) dimethylamine, (2) carbon disulfide, and (3) potassium hydroxide in an aqueous medium; then adding thereto with agitation (B) a substantially equimolecular quantity of (tert-dodecylmercapto)-zinc acetate dissolved in an inert water-immiscible organic solvent and continuing agitation for from about 30 minutes to about 1 hour to effect substantial completion of the reaction, separating the solvent phase from the aqueous phase and washing said solvent phase with water until substantially neutral and free from water-soluble salts.

13. The process of preparing (tert-octylmercapto)-zinc N,N-dimethyl dithiocarbamate comprising the reaction of (A) substantially equimolecular quantities of dimethylamine, (2) carbon disulfide, and (3) potassium hydroxide in an aqueous medium; then adding thereto with agitation (B) a substantially equimolecular quantity of (tert-octylmercapto)-zinc acetate dissolved in an inert water-immiscible organic solvent and continuing agitation for from about 30 minutes to about 1 hour to effect substantial completion of the reaction, separating the solvent phase from the aqueous phase and washing said solvent phase with water until substantially neutral and free from water-soluble salts.

14. The process of preparing (tert-tetradecylmercapto)-zinc N,N-dimethyl dithiocarbamate comprising the reaction of (A) substantially equimolecular quantities of (1) dimethylamine, (2) carbon disulfide, and (3) potassium hydroxide in an aqueous medium; then adding thereto with agitation (B) a substantially equimolecular quantity of (tert-tetradecylmercapto)-zinc acetate dissolved in an inert water-immiscible organic solvent and continuing agitation for from about 30 minutes to about 1 hour to effect substantial completion of the reaction, separating the solvent phase from the aqueous phase and washing said solvent phase with water until substantially neutral and free from water-soluble salts.

15. A mercaptide-dithiocarbamate zinc salt selected from the group consisting of (tert-dodecylmercapto)-zinc N,N-di-n-butyl dithiocarbamate, (tert-octylmercapto)-zinc N,N-di-n-butyl dithiocarbamate, (tert-dodecylmercapto)-zinc N,N-dimethyl dithiocarbamate, (tert-octylmercapto)-zinc N,N-dimethyl dithiocarbamate, and (tert-tetradecylmercapto)-zinc N,N-dimethyl dithiocarbamate.

References Cited in the file of this patent

UNITED STATES PATENTS

| Number | Name | Date |
|---|---|---|
| 1,852,721 | Morton | Apr. 5, 1932 |
| 2,102,547 | Sebrell | Dec. 14, 1937 |
| 2,321,301 | Lichty | June 8, 1943 |